US008619737B2

(12) United States Patent
Hirano et al.

(10) Patent No.: US 8,619,737 B2
(45) Date of Patent: Dec. 31, 2013

(54) MOBILE NODE AND COMMUNICATION CONTROL METHOD

(75) Inventors: Jun Hirano, Osaka (JP); Chan Wah Ng, Singapore (SG); Tien-Ming Benjamin Koh, Singapore (SG); Pek Yew Tan, Singapore (SG)

(73) Assignee: Panasonic Corporation, Osaka (JP)

( * ) Notice: Subject to any disclaimer, the term of this patent is extended or adjusted under 35 U.S.C. 154(b) by 163 days.

(21) Appl. No.: 13/226,258

(22) Filed: Sep. 6, 2011

(65) Prior Publication Data

US 2012/0002653 A1   Jan. 5, 2012

Related U.S. Application Data

(62) Division of application No. 11/994,841, filed as application No. PCT/JP2006/314010 on Jul. 7, 2006, now Pat. No. 8,036,189.

(30) Foreign Application Priority Data

Jul. 8, 2005   (JP) .................................. 2005-200985

(51) Int. Cl.
*H04W 4/00* (2009.01)
(52) U.S. Cl.
USPC .......................................................... 370/338
(58) Field of Classification Search
USPC .......................................................... 370/338
See application file for complete search history.

(56) References Cited

U.S. PATENT DOCUMENTS

| | | | |
|---|---|---|---|
| 6,904,466 B1 | 6/2005 | Ishiyama | |
| 6,959,341 B1 | 10/2005 | Leung | |
| 7,401,216 B2 * | 7/2008 | Arkko et al. | 713/153 |
| 2003/0174688 A1 * | 9/2003 | Ahmed et al. | 370/349 |
| 2004/0063402 A1 * | 4/2004 | Takeda et al. | 455/41.1 |
| 2004/0071120 A1 * | 4/2004 | Grech | 370/338 |
| 2004/0105420 A1 * | 6/2004 | Takeda et al. | 370/349 |
| 2004/0142657 A1 | 7/2004 | Maeda | |
| 2004/0165565 A1 | 8/2004 | Omae | |
| 2004/0166843 A1 | 8/2004 | Hahn | |

(Continued)

FOREIGN PATENT DOCUMENTS

| | | |
|---|---|---|
| EP | 1 370 041 | 12/2003 |
| EP | 1 432 198 | 6/2004 |

(Continued)

OTHER PUBLICATIONS

International Search Report dated Oct. 5, 2006.

(Continued)

*Primary Examiner* — Kenny Lin
(74) *Attorney, Agent, or Firm* — Seed IP Law Group PLLC (57) ABSTRACT

A technology is disclosed for a mobile device with multiple interfaces to make use of its multiple interfaces capability with Mobile IP. According to this technology, MN (Mobile Node) 100 comprises a cellular interface to connect to the cellular network 112 and a Wireless-LAN interface to connect to the local network 122 and 132, and sends a Binding Update message to set the address of the Wireless-LAN interface to CoA (Care-of Address) to HA (Home Agent) at the cellular network or CN (Correspondent Node) 160. This Binding Update message includes a special label indication that the cellular interface is currently connected to the home network.

10 Claims, 7 Drawing Sheets

(56) References Cited

U.S. PATENT DOCUMENTS

| | | |
|---|---|---|
| 2005/0007995 A1 | 1/2005 | Inoue |
| 2005/0237983 A1* | 10/2005 | Khalil et al. ............ 370/338 |
| 2006/0050628 A1 | 3/2006 | Ng |
| 2006/0146748 A1* | 7/2006 | Ng et al. ............ 370/331 |
| 2009/0019180 A1* | 1/2009 | Aso et al. ............ 709/238 |
| 2009/0147789 A1* | 6/2009 | Ng et al. ............ 370/392 |
| 2009/0265453 A1* | 10/2009 | Hirano et al. ............ 709/223 |

FOREIGN PATENT DOCUMENTS

| | | |
|---|---|---|
| EP | 1 578 067 | 9/2005 |
| EP | 1 635 515 | 3/2006 |
| JP | 2003-125433 A | 4/2003 |
| JP | 5258947 B2 | 8/2013 |
| WO | 00/42755 | 7/2000 |
| WO | 2004/059926 | 7/2004 |
| WO | 2004/111750 | 12/2004 |

OTHER PUBLICATIONS

D. B. Johnson, et al., "Mobility Support in IPv6," Internet Engineering Task Force Request for Comments 3775, Jun. 2004, pp. 1-165.

R. Wakikawa, et al., "Multiple Care-of Addresses Registration," Internet Draft: draft-wakikawa-mobileip-multiplecoa-03.txt (expired), Jul. 2004, pp. 1-27.

Office Action, mailed Sep. 10, 2013, for corresponding Japanese Application No. 2013-012053, 3 pages.

* cited by examiner

MOBILE NODE AND COMMUNICATION CONTROL METHOD

This is a divisional application of application Ser. No. 11/994,841 filed Jan. 6, 2008, which is a national stage of PCT/JP2006/314010 filed Jul. 7, 2006, which is based on Japanese Application No. 2005-200985 filed Jul. 8, 2005, the entire contents of each which are incorporated by reference herein.

TECHNICAL FIELD

The present invention relates to the technology of telecommunication in a packet-switched data communication network. More particularly, the present invention relates to the technology for controlling communication of a mobile node with multiple access interfaces.

BACKGROUND ART

Nowadays, technological advances have enabled people to get connected to the Internet anytime and anywhere. In fact, people are relying more and more on the continued connectivity to the Internet in different faces of our everyday lives: for business, for study, for entertainment, and for personal use. To such ends, recent development in wireless technologies even allows us to get connected while on the move. Multimode terminals with the ability to connect to the Internet using a wide range of access technologies, such as Third Generation (3G) cellular networks, General Packet Radio Service (CPRS), IEEE 802.11a/b/g and Bluetooth are also getting more popular.

Various portable computing devices such as handheld mobiles, laptops and personal digital assistants (PDAs) with enhanced networking capabilities have increased the demand for seamless communication both in wired and wireless networks. Increased use of multimedia contents such as video conferencing makes seamless communication an essential and required feature in mobile connections. Practical mobility management should provide seamless handoff where the user does not observe communication disruptions. Today's mobile data networks commonly consist of several wireless overlapping networks, supporting different data rates and geographical coverage and can only be accessed via media specific air interfaces.

Many devices today communicate with each other using the Internet Protocol (IP). In order to provide mobility support to mobile devices, the Internet Engineering Task Force (IETF) has developed the Mobility Support in IPv6 (see the following Non-patent Document 1). In Mobile IP, each mobile node has a permanent home domain. When the mobile node is attached to its home network, it is assigned a primary global address known as a home address (HoA). In this specification, the situation that the mobile node is attached to its home network is also called "at home".

When the mobile node is away, i.e. attached to some other foreign networks, it is usually assigned a temporary global address known as a care-of address (CoA). The idea of mobility support is such that the mobile node can be reached at the HoA even when it is attached to other foreign networks.

This is done in the Non-patent Document 1 with an introduction of an entity at the home network known as a home agent (HA). Mobile node registers its CoA with the home agent using messages known as Binding Updates (BU). This allows the home agent to create a binding between the HoA and CoA of the mobile node. The home agent is responsible to intercept messages that are addressed to the mobile node's HoA, and forward the packet to the mobile node's CoA using packet encapsulation (i.e. putting one packet as the payload of a new packet, also known as packet tunneling).

Binding Update messages can also be sent to the peer the mobile node is communicating with, known as the correspondent node (CN), so the correspondent node can send packets meant for the home address of the mobile node to the care-of address of the mobile node.

[Patent Document 1] European Patent Publication EP1432198
[Patent Document 2] PCT Patent Publication WO 00/42755
[Patent Document 3] Publication of US Patent Application 2004-0142657
[Non-patent Document 1] Johnson, D. B., Perkins, C. E., and Arkko, J., "Mobility Support in IPv6", Internet Engineering Task Force Request For Comments 3775, June 2004.
[Non-patent Document 2] Wakikawa, R., "Multiple Care-of Addresses Registration", Internet Draft: draft-wakikawa-mobileip-multiplecoa-03.txt (expired), July 2004.

Mobile IPv6, however, is ill-suited to take advantage of the fact that a mobile node can have multiple access interfaces, which is getting more and more common. For instance, all notebook computers these days have both 802.11/ab/g and Bluetooth interfaces. Phones with 3G, bluetooth, and wireless-LAN capabilities are already beginning to appear in the market.

A few prior arts have attempted to make use of multiple access interfaces with Mobile IP. The Patent Document 1 describes a method of handover of flows using different home addresses. Although this allows the mobile node to make use of multiple accesses to ease handovers, it does not describe how a mobile node can use both interfaces simultaneously.

For that, the Patent Document 2 proposes a mechanism that allows the mobile node to transmit connectivity information to its home agent, thus allowing its home agent to forward packets according to such connectivity information. This is, however, restricted to only the home agent. It is unclear how the correspondent node can receive such connectivity information.

The Patent Document 3 describes a method for the mobile node to selectively register different care-of addresses with its home agent and correspondent node. The Non-Patent Document 2 suggests a way for a mobile node to bind multiple care-of addresses to the same home address at the home agent and correspondent node.

Although the Patent Document 3 and Non-Patent document 2 specify ways for a mobile node to make use of multiple addresses at once, they suffer from two main constraints.

Firstly, care-of address registration cannot be used when one of the interfaces is at home. It is a common scenario for a mobile device to have a wireless-LAN interface for hotspot surfing, and a 3G (or GPRS) connection. It is usually the 3G connection that provides Mobile IP services. However, as 3G and GPRS services typically have a wide coverage, the mobile device is usually connected to its home network most of the time. In such cases, both the Patent Document 3 and Non-Patent document 2 cannot be used.

Secondly, both the Patent Document 3 and Non-Patent document 2 rely on the existence of home agents. Although it is a growing trend among service providers to provide Mobile IP services, many cellular operators have yet to offer home agent services to their subscribers. When there is no home agent available, both the Patent Document 3 and Non-Patent document 2 cannot be used.

DISCLOSURE OF THE INVENTION

It is thus an object of the present invention to overcome or at least substantially ameliorate the afore-mentioned disadvantages and shortcomings of the prior art. Specifically, it is an object of the present invention to provide a method for a mobile device with multiple interfaces to make use of its multiple interfaces capability with Mobile IP, regardless whether if one of its interfaces is currently connected at home or not. A further object is to provide a similar method for a mobile device with multiple interfaces to make use of its multiple interfaces capability with Mobile IP, regardless of whether its service providers offer Mobile IPv6 services or not.

To attain the above-mentioned object of the present invention, the mobile node of the present invention is a mobile node implementing Mobile IP and being movable, comprising:

a plurality of network interfaces;

means for choosing one of addresses configured on the plurality of network interfaces as a home address;

means for associating an address configured on another interface which is different from the interface of the chosen address as the home address, with a care-of for the home address; and means for sending a message including information on a binding between the home address and the care-of address, to a correspondent node that the mobile node communicates with or a home agent that manages the chosen address as the home address.

Furthermore, in addition to the above-mentioned mobile node, the mobile node of the present invention comprises means for inserting, into the message, information indicating that the network interface chosen as the home address is currently connected to a home network.

Furthermore, in addition to the above-mentioned mobile node, the mobile node of the present invention comprises:

means for configuring a care-of address for the home address on the network interface chosen as the home address even if the network interface chosen as the home address is currently connected to a home network; and means for inserting the care-of address on the network interface chosen as the home address into the message.

Furthermore, in addition to the above-mentioned mobile node, in the mobile node of the present invention, the address chosen as the home address is an address available within a wide coverage area, and an address configured on the other network interface chosen as the care-of address is an address available within a smaller service area than the wide service area.

Furthermore, in addition to the above-mentioned mobile node, the mobile node of the present invention comprises means for determining whether the mobile node sends the message including information on the binding between the home address and the care-of address or not when establishing a new session, based on an expected duration of the session or a type of data delivered on the session.

To attain the above-mentioned object of the present invention, the communication control method of the present invention is a communication control method performed in a mobile node with a plurality of network interfaces, the mobile node implementing Mobile IP and being movable, the communication control method comprising the steps of:

choosing one of addresses configured on the plurality of network interfaces as a home address;

associating an address configured on another interface which is different from the interface of the chosen address as the home address, with a care-of for the home address; and sending a message including information on a binding between the home address and the care-of address, to a correspondent node that the mobile node communicates with or a home agent that manages the chosen address as the home address.

Furthermore, in addition to the above-mentioned mobile node, the communication control of the present invention comprises a step of inserting, into the message, information indicating that the network interface chosen as the home address is currently connected to a home network.

Furthermore, in addition to the above-mentioned mobile node, the communication control of the present invention comprises the steps of configuring a care-of address for the home address on the network interface chosen as the home address even if the network interface chosen as the home address is currently connected to a home network; and inserting the care-of address on the network interface chosen as the home address into the message.

Furthermore, in addition to the above-mentioned mobile node, in the communication control of the present invention, the address chosen as the home address is an address available within a wide coverage area, and an address configured on the other network interface chosen as the care-of address is an address available within a smaller service area than the wide service area.

Furthermore, in addition to the above-mentioned mobile node, the communication control of the present invention comprises a step of determining whether the mobile node sends the message including information on the binding between the home address and the care-of address or not when establishing a new session, based on an expected duration of the session or a type of data delivered on the session.

The present invention has the advantage that a mobile device with multiple interfaces can make use of its multiple interfaces capability with Mobile IP, regardless whether if one of its interfaces is currently connected at home or not. Furthermore, the present invention also has the advantage that a mobile device with multiple interfaces can make use of its multiple interfaces capability with Mobile IP, regardless of whether its service providers offer Mobile IPv6 services or not.

BEST MODE FOR CARRYING OUT THE INVENTION

Figure 1:
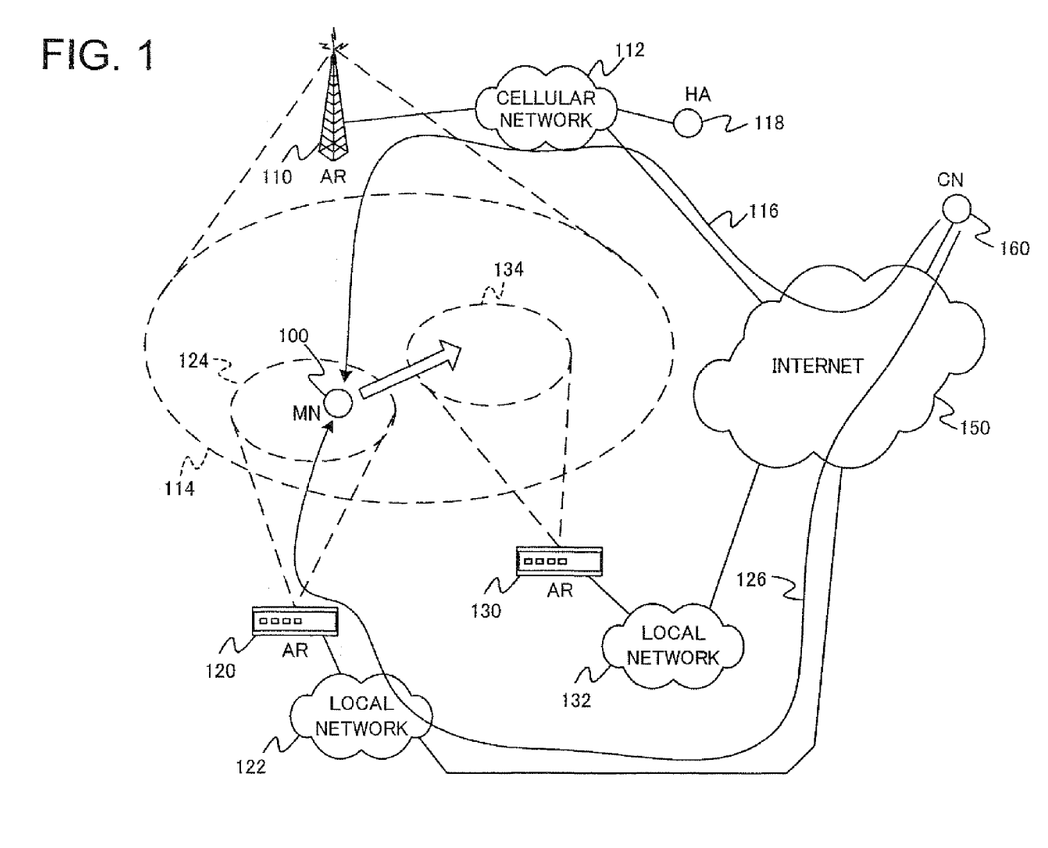
FIG. 1 is a diagram showing the network composition according to an embodiment of the present invention.

Description will be given below on the preferred aspects of the present invention referring to the drawings. FIG. 1 is a diagram showing the network composition according to an embodiment of the present invention. As illustrated in FIG. 1, a mobile node has two network access interfaces. The first access interface is connected to the access router (AR) 110, which provides a wide coverage area (service area) 114. The first access interface can be typically connected to, for example, a cellular packet-switched network (cellular network) 112, such as the 3G or GPRS network. For clarity purpose, this first access interface is henceforth referred to as the C-Interface.

The second access interface is connected to the access router (AR) 120, which provides a smaller coverage area (service area) 124. The first access interface can be typically connected to a wireless local area network, such as the 802.11a/b/g. Shown in FIG. 1 is another access router (AR) 130, which provides the same form of connection technology as AR 120. AR 130 has also a small coverage area 134. For clarity purpose, this second access interface is henceforth referred to as the W-Interface.

The MN 100 obtains its connectivity to the global communication network, such as the Internet 150, through AR 110 via the cellular network 112, of which AR 110 is part of the network. Alternatively, MN 100 can also reach the Internet 150 via AR 120 through the local network 122, of which AR 120 is part of the network.

Suppose MN 100 is communicating with a correspondent node (CN) 160 somewhere in the Internet 150. To reach MN 100, CN 160 can use multiple routes with multiple interfaces and multiple connections. The first route, shown in FIG. 1, is through the path 116, via the cellular network 112 and AR 110 using the C-interface of MN 100. The second route, shown in FIG. 1, is through the path 126, via the local network 122 and AR 120 using the W-Interface of MN 100.

Typically, the C-Interface link between AR 110 and MN 100 has a narrow bandwidth (compared to W-Interface link between AR 120 and MN 100), so the path 116 is slower compared to the path 126. However, if MN 100 is moving, the W-Interface between MN 100 and AR 120 is more likely to break because the coverage area 124 is a lot smaller than the coverage area 114. As indicated in FIG. 1, once MN 100 moves out of the coverage area 124 and enters the coverage area 134, it will break its association with AR 120 and establish a new association with AR 130. The path 126 will then be broken.

In order for the communication session not to be broken, CN 160 can use the path 116 instead of the path 126. This means, however, the bandwidth available is much smaller. To solve this problem, one preferable embodiment of the present invention allows the MN 100 to send a special binding update (BU) message to its home agent (HA) 118 provided by the cellular network 112. In this BU message, MN 100 will register the address it configures from the network interface connected to local network 122 as a care-of address (CoA). The address from the network interface connected to the cellular network 112 is obviously the home address (HoA). The technology according to the Non-Patent Document 1 does not allow this form of binding update because MN 100 is currently attached to the cellular network 112 (i.e. MN 100 is at home). The present invention overcomes this by allowing MN 120 to register more than one CoA in a BU message. In the BU message, MN 100 will specify that it has two interfaces. One of them has the CoA configured from the W-interface connected to local network 122. The other interface (i.e. C-Interface) that is connected to the cellular network 112 has a special CoA that identifies itself as an "at-home" label. When HA 118 receives such a BU message, it will know that the MN 100 is reachable by two addresses: one is directly at the HoA of MN 100, due to the special "at-home" label; and the other is at the CoA from local network 122.

Figure 2:
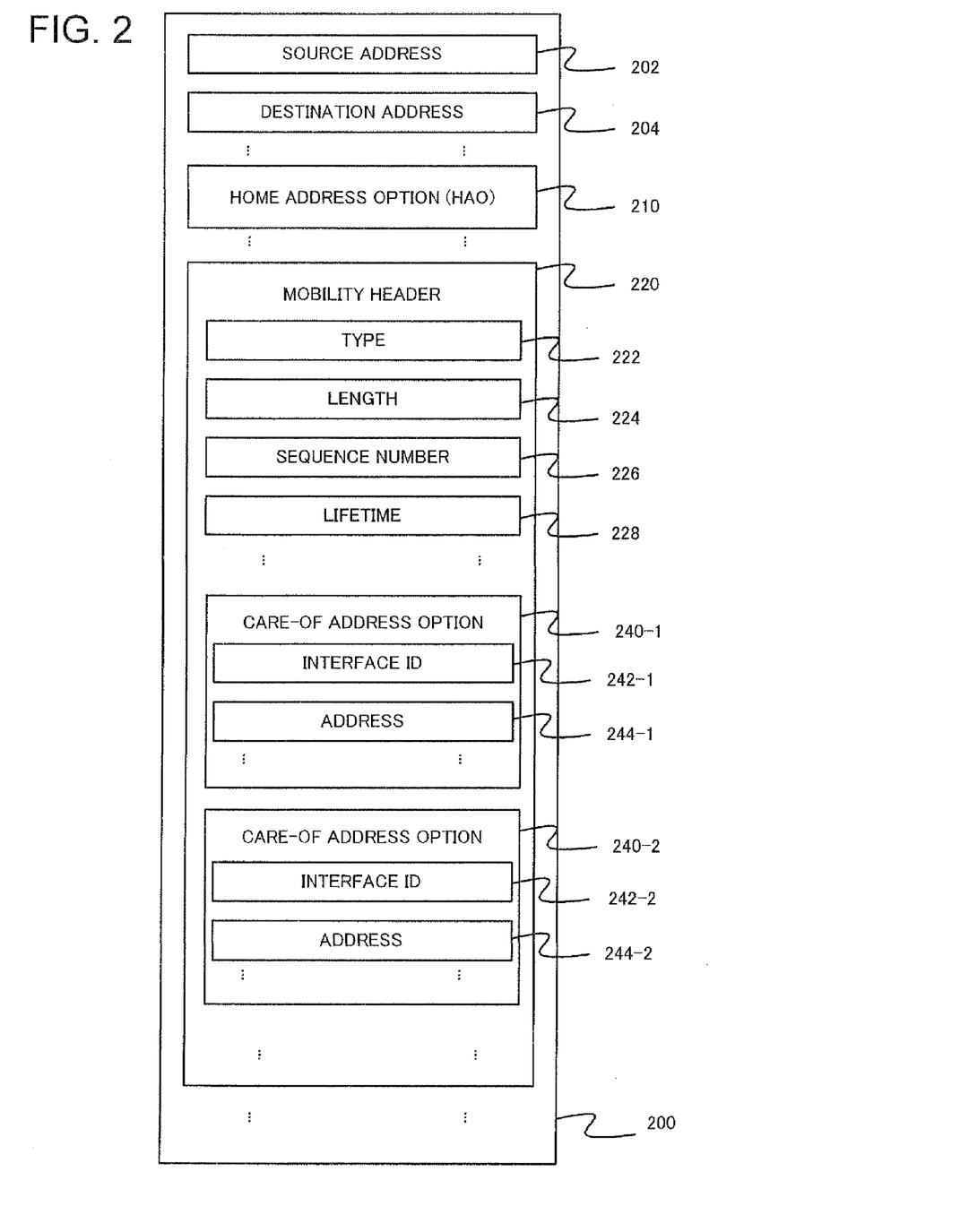
FIG. 2 is a diagram showing an example of the contents of BU message used in the embodiment of the present invention.

FIG. 2 is a diagram showing an example of the contents of BU message used in the embodiment of the present invention. The source address field 202 and destination address field 204 of the BU message 200, shown in FIG. 2, should contain an address of MN 100 and the address of HA 118 respectively. The BU message should contain a Home Address Option (HAO) 210 to convey the HoA of MN 100.

The actual content of the BU message is stored in the mobility header 220. The type field 222 specifies this message as a Binding Update message, and the Length field 224 specifies the size of the mobility header 220. The sequence number field 226 is a monotonically increasing number to identify the BU message and also protects against replay attacks. The lifetime field 228 indicates the length of time within which the bindings specified in the BU message is valid.

The BU message 200 can contain zero, one, or more care-of address options 240. In this case, as an example, two care-of address options 240-1 and 240-2 are illustrated. Each care-of address option 240 contains an Interface ID field 242 to identify the network interface, and an Address field 244 to specify the CoA associated with the network interface. The Interface ID is preferably uniquely assigned by the mobile node. There may be other fields in the care-of address option 240, such as those conveying preference values, but are omitted from FIG. 2. The Interface ID field 242 can be omitted in case of no need to identify the Interface ID.

Using the example in FIG. 1, MN 100 will send HA 118 with a BU message 200 containing two care-of address options. The first care-of address option 240-1 will have an Interface ID field 242-1 that identifies the C-Interface connected to AR 110. The address field 242-1 will contain a special label that identifies as the "at-home" label. This informs HA 118 that this C-Interface is currently attached to the home network.

The second care-of address option 240-2 will have an Interface ID filed 242-2 that identifies the W-Interface connected to AR 120. The address field 242-2 will contain the CoA configured from the local network 122.

The special "at-home" label can be any pre-defined series of bit patterns. Preferably, the "at-home" label can be the all-zero address or the all-one address. Yet another preferable approach is to define the "at-home" label to be identical to the HoA of MN 100.

It should be obvious to a person skilled in the art that even though the above example specifies that the two care-of addresses are inserted in a single BU message, the same effect can be achieved with two separate BU messages, each specifying one CoA.

Figure 3:
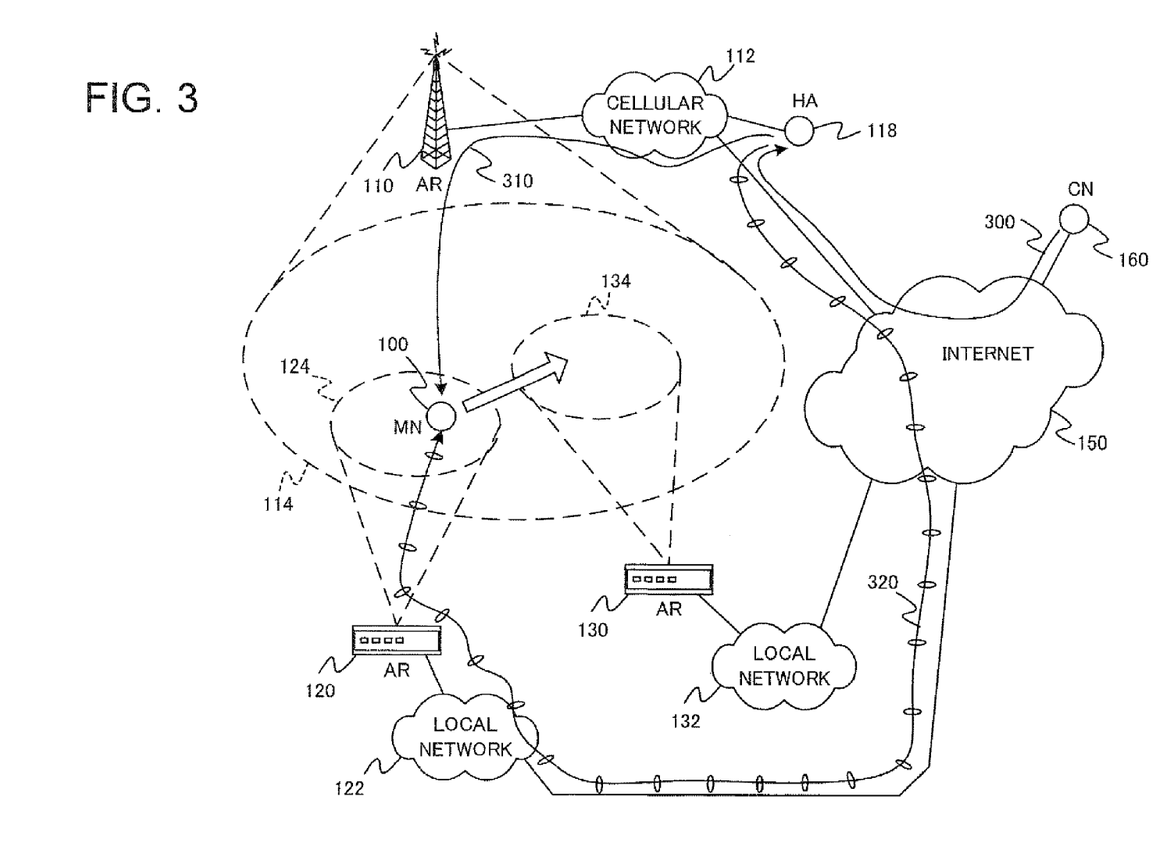
FIG. 3 is a diagram showing the network composition to explain the advantage of the case that a special BU message is used, according to an embodiment of the present invention.

FIG. 3 is a diagram showing the network composition to explain the advantage of the case that a special BU message is used, according to an embodiment of the present invention. In FIG. 3, CN 160 will always transmit packets to the HoA of MN 100. The packet will follow the path 300 and reach HA 118. HA 118 will intercept the packet, and look at its binding cache table. HA 118 will find that MN 100 has two connected interfaces, one at the specified CoA from local network 122, and the other has an "at-home" label.

Based on pre-determined criteria (such as preference settings or some flow label marked on the packet), HA 118 can forward the packet via the path 310 or path 320. The path 310 means HA 118 does not need to encapsulate the packet, since the destination address, which is the HoA of MN 100, remains unchanged. If the path 320 is chosen, then HA 118 needs to encapsulate the packet and forward it to the CoA of MN 100 via the local network 122. Normally, the path 320 should be chosen, since the W-Interface link has a higher bandwidth. Even after MN 100 has moved to the coverage area 134 (and is attached to AR 130), packet delivery is not disrupted as long as after MN 100 has changed its CoA on the W-Interface, it updates HA 118 with a new BU message.

It should be obvious to a person skilled in the art that the same effect can be achieved if MN 100 sends the same BU message to CN 160. In this case, CN 160 will know that MN 100 is reachable via two paths: one through AR 110 using the C-Interface and the other through AR 120 using the W-Interface. Normally, the path through AR 120 should be chosen, since the W-Interface link has a higher bandwidth. Even after MN 100 has moved to the coverage area 134 (and is attached to AR 130), packet delivery is not disrupted as long as after MN 100 has changed its CoA on the W-Interface, it updates CN 160 with a new BU message.

According to a preferred mode of operation of the present invention in the above description, the home agent needs to understand the "at-home" label. We now provide another preferred mode of operation where the home agent does not understand the "at-home" label. This mode of operation is to make the home agent determine (believe) that MN 100 is not at its home network even when MN 100 is attached to its home network.

Usually, MN 100 will be pre-assigned a HoA to use when it is connected to its home network (i.e. cellular network 112) via its C-interface. In another preferred mode of operation of the present invention, MN 100 will auto-configure a second address on its C-Interface based on the prefix advertised by AR 110. This second address must be different from its assigned HoA. MN 100 uses this second address as a CoA for its C-Interface. Thus, MN 100 will send to HA 118 a BU message similar to that described previously.

The BU message will also contain two care-of address options 240-1 and 240-2. The first care-of address option 240-1 will have an Interface ID field 242-1 that identifies the C-Interface connected to AR 110, and the address field 244-1. The address field 244-1 will contain the second address auto-configured on its C-Interface. The second care-of address option 240-2 will have an Interface ID filed 242-2 that identifies the W-Interface connected to AR 120, and the address field 244-2. The address field 244-2 will contain the CoA configured from the local network 122.

It should be obvious to a person skilled in the art that even though the above example specifies that the two care-of addresses are inserted in a single BU message, the same effect can be achieved with two separate BU messages, each specifying one CoA.

Referring FIG. 3 again, the effect of this BU message will be described. CN 160 will always transmit packets to the HoA of MN 100. The packet will follow the path 300, and reach HA 118. HA 118 will intercept the packet, and look at its binding cache table. HA 118 will find that MN 100 has two connected interfaces, one at the second CoA using the C-Interface, and one at the CoA using the W-Interface.

Based on pre-determined criteria (such as preference settings or some flow label marked on the packet), HA 118 can forward the packet via path 310 or path 320. For any one of paths, HA 118 needs to encapsulate the original packet, since the destination address has been changed. Nominally, path 320 should be chosen, since the W-Interface link has a higher bandwidth. Even after MN 100 has moved to the coverage area 134 (and is attached to access router AR 130), packet delivery is not disrupted as long as after MN 100 has changed its CoA on the W-Interface, it updates HA 118 with a new BU message.

This preferred mode of operation effectively allows MN to trick HA 118 into thinking that MN 100 is not at home, even though its C-Interface is connected to the cellular network 112. It should be obvious to a person skilled in the art that the same effect can be achieved if MN 100 sends the same BU message to CN 160. In this case, CN 160 will know that MN 100 is reachable via two paths: one through AR 110 using the C-Interface and the other through AR 120 using the W-Interface. Normally, the path through AR 120 should be chosen, since the W-Interface link has a higher bandwidth. Even after MN 100 has moved to the coverage area 134 (and is attached to access router AR 130), packet delivery is not disrupted as long as after MN 100 has changed its CoA on the W-Interface, it updates CN 160 with a new BU message.

The above description illustrates two preferred modes of operation of the present invention. However, they require the presence of a home agent that supports the registration of multiple CoAs. We now provide yet another preferred mode of operation where the home agent does not need to support the registration of multiple CoAs. In this mode of operation, there is even no need for there to be any home agent provided. This is best illustrated in FIG. 4.

Figure 4:
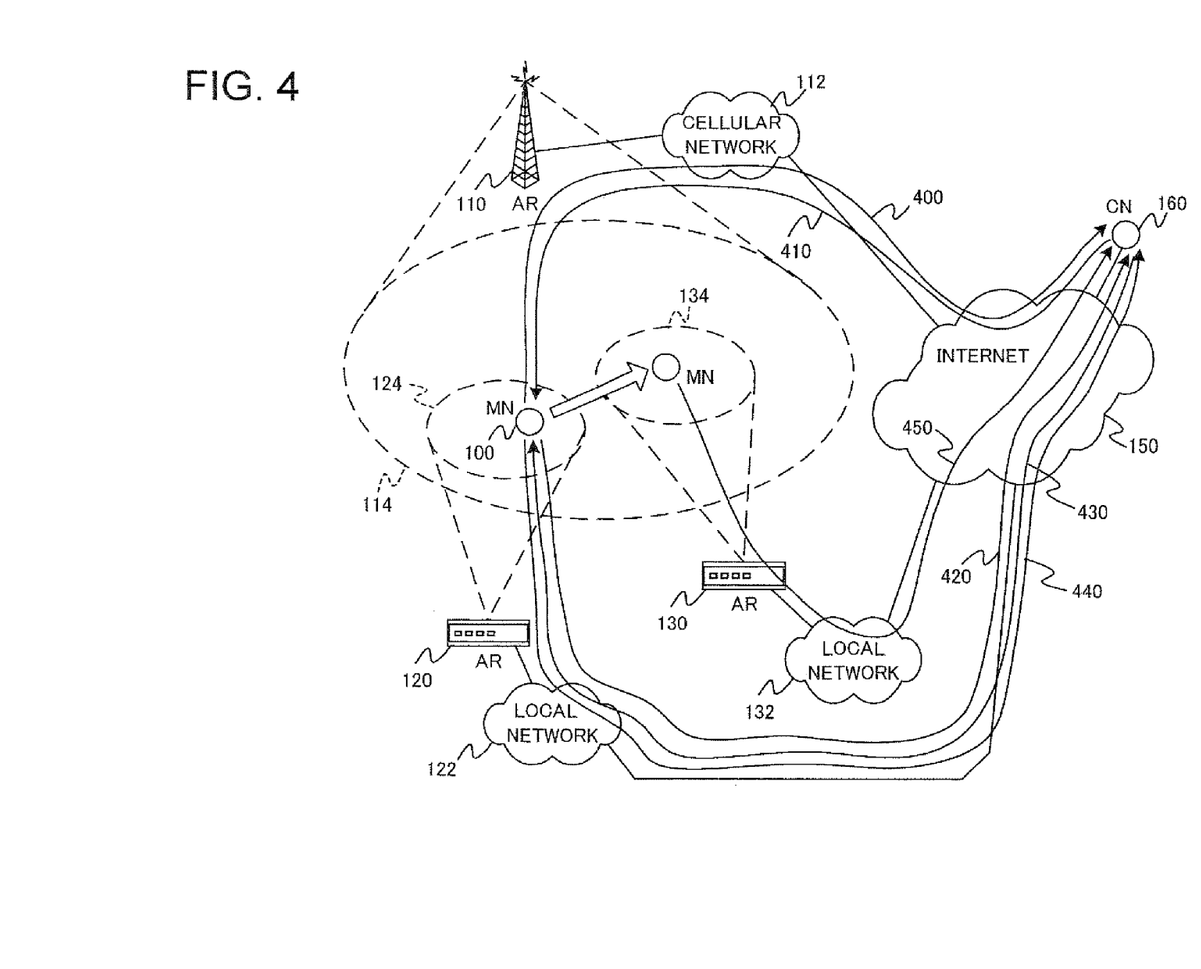
FIG. 4 is a network composition diagram schematically showing the mode of operation when there is no home agent according to the embodiment of the present invention.

FIG. 4 is a network composition diagram schematically showing the mode of operation when there is no home agent according to the embodiment of the present invention. When MN 100 wishes to establish with, say CN 160, a session, which will survive for a relatively long period of time, it would first establish the session using the address of the C-Interface. In order to use the W-Interface which offers a higher bandwidth, MN 100 will next initiate the return routability procedure with CN 160 as specified by the Non-Patent Document 1. However, the virtue of the present invention lies in the fact that MN 100 does not need to have a bi-directional tunnel established with a home agent to start the return routability procedure, unlike the requirement of the Non-Patent Document 1. MN 100 simply transmits the home test init (HoTI) message 400 to CN 160 through the C-Interface. In the prior-art, the HoTI message needs to be transmitted through the home-agent. In addition, MN 100 will transmit the care-of test init (CoTI) message 420 through the W-Interface. Here, the HoTI message 400 will have a source address equal to the address of the C-Interface, and the CoTI message 420 will have a source address equal to the address of the W-Interface. Both the HoTI message 400 and CoTI message 420 will have a destination address equal to the address of CN 160.

According to the return routability procedure, CN 160 will respond to the HoTI message 400 with a home test (HoT) message 410 transmitted to the address of the C-Interface of MN 100. This HoT message 410 will reach MN 100 via the cellular network 112. According to the prior art, a HoT message must be intercepted by the home agent and forwarded to the CoA of the mobile node. In the present invention, since MN 100 is connected directly to the cellular network 112, the HoT message 410 will be sent directly to the C-Interface of MN 100, without any need for the home agent to intercept and forward.

In addition, CN 160 will respond to the CoTI message 420 with a care-of test (CoT) message 430 transmitted to the address of the C-Interface of MN 100. After receiving both the HoT message 410 and CoT message 430, MN 100 can complete the return mutability procedure by sending to CN 160 a BU message 440. The BU message 440 will have the source address equal to the address of the W-Interface. This serves as the CoA. The BU message 440 will also contain a home address destination option (HAO) that specifies the HoA as equal to the address of the C-Interface.

Effectively, this preferred mode of operation allows MN 100 to use the address on the long-ranged C-Interface (with a wide service area) as a HoA, and use the address on the short-ranged W-Interface (with a small service area) as a CoA, regardless of the existence of a home agent. Since the C-Interface is long-ranged, there will not be frequent changes to the HoA, thus allowing prolonged session continuity. Furthermore, since the CoA is configured from the W-Interface that has a higher bandwidth, the session can enjoy a much higher transmission rate. Even when MN 100 later leaves the coverage area 124 (thus disconnected from AR 120) and enters a new coverage area 134 (thus connected to AR 130), it can send a new BU message 450 specifying the new address of the W-Interface as the CoA, and thus enjoy prolonged session continuity.

Figure 5:
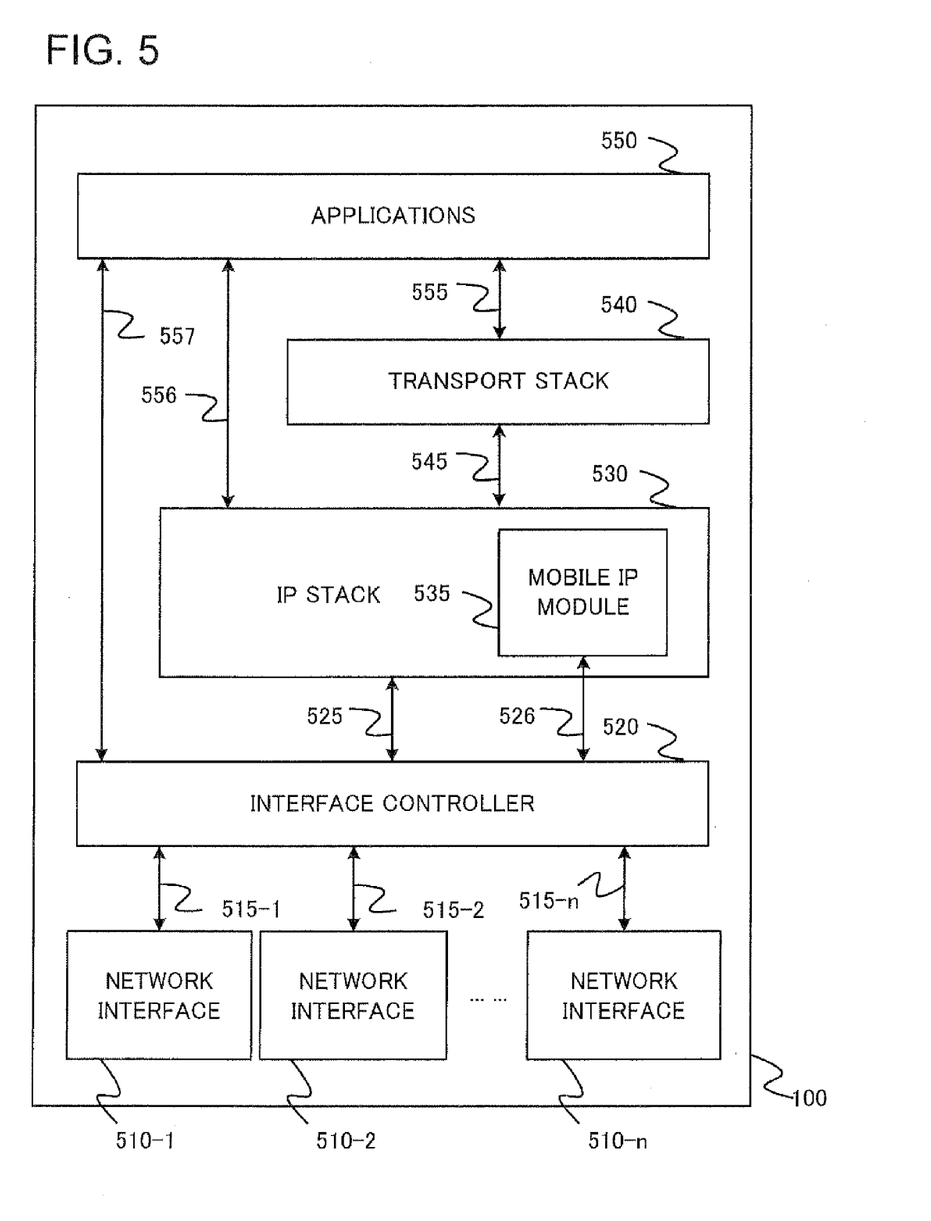
FIG. 5 is a diagram showing a functional architecture of the mobile node according to the embodiment of the present invention.

Referring to FIG. 5, a functional architecture of MN 100 will be described to implement the preferred embodiment of the present invention. FIG. 5 is a diagram showing a functional architecture of the mobile node according to the embodiment of the present invention. MN 100 consists of a plurality of network interfaces 510-1 through 510-n, n being an integer greater than 1, an interface controller 520, an IP stack 530, a transport stack 540, and applications layer 550.

Each network interface 510-x (x being any integer from 1 to n) is a functional block that represents all networking hardware, software and protocols that are necessary to allow the MN 100 to communicate with other nodes using an access technology. For instance, under the International Standards Organization's (ISO) Open System Interconnect (OSI) 7-layers model, the network interface 510-x will encompass the Physical and Data Link Layers. An example will be that network interface 510-1 represents the physical hardware and software drivers for 3G access, and network interface 510-2 represents the physical hardware and software drivers for 802.11g access.

The interface controller 520 selects the interface for the transmission and reception of a packet. This is typically the job of the IP stack 530 in prior art. The present invention, however, has a unique functionality to be implemented on the interface controller 520 as will be specified later. Packets received by any network interface 510-x will be passed to the interface controller 520 via the packet path data path 515-x. Similarly, after the interface controller 520 has selected a network interface 510-x for the transmission of a packet, the packet will be passed to the network interface 510-x via the packet data path 515-x.

The IP stack 530 handles all processing with respect to routing in the internetworking layer. Under the OSI model, it encompasses all functionalities of Network Layer. It basically implements the IPv6 functionality. Because MN 100 is mobile, the IP stack 530 consists of a Mobile IP module 535 that implements the Mobile IPv6 functionality as specified in the Non-Patent Document 1. Any packet that is received by the interface controller 520 is passed to the IP stack 530 via the packet data path 525. Similarly, any packet that IP stack 530 needs to deliver will be passed to the interface controller 520 via the packet data path 525. The interface controller 520 sometimes needs to pass or receive packets directly from the Mobile IP module 535. This is done via the packet data path 526.

The transport stack 540 handles all transport session protocols, such as Transmission Control Protocol (TCP) and User Datagram Protocol (UDP). Under the OSI model, it encompasses all functionalities of Session and Transport Layers. When the transport stack 540 has some data to transmit, it will pass it down to the IP stack 530 via the data path 545. Similarly, when the IP stack 530 receives data for the transport stack 540, the data will be passed via the data path 545.

The applications layer 550 represents all software and user programs that require network communication with other nodes. Under the OSI model, it encompasses all functionalities of Applications and Presentation Layers. When the applications layer 550 has data to transmit, it will usually pass it down to the transport stack 540 for packetization via the data path 555. Sometimes, the applications layer 550 may choose to pass chunks of data down directly to IP stack 530 via the data path 556. Similarly, the applications layer 550 can retrieve received data from the transport stack 540 via the data path 555 or from the IP stack 530 via the data path 556. There is also a signal path 557 that allows applications layer 550 to transmit/receive certain signals to/from the interface controller 520. The use of this signal path 557 will become clear later.

Because the present invention allows the mobile node to use an address from one interface as the HoA and an address from another interface as CoA, the traditionally assumed relationship between addresses and network interfaces in prior arts no longer holds true. Therefore, there is a need for a mechanism to select the network interface when a packet needs to be transmitted. One preferred way is to implement such functionality in the interface controller 520.

Figure 6:
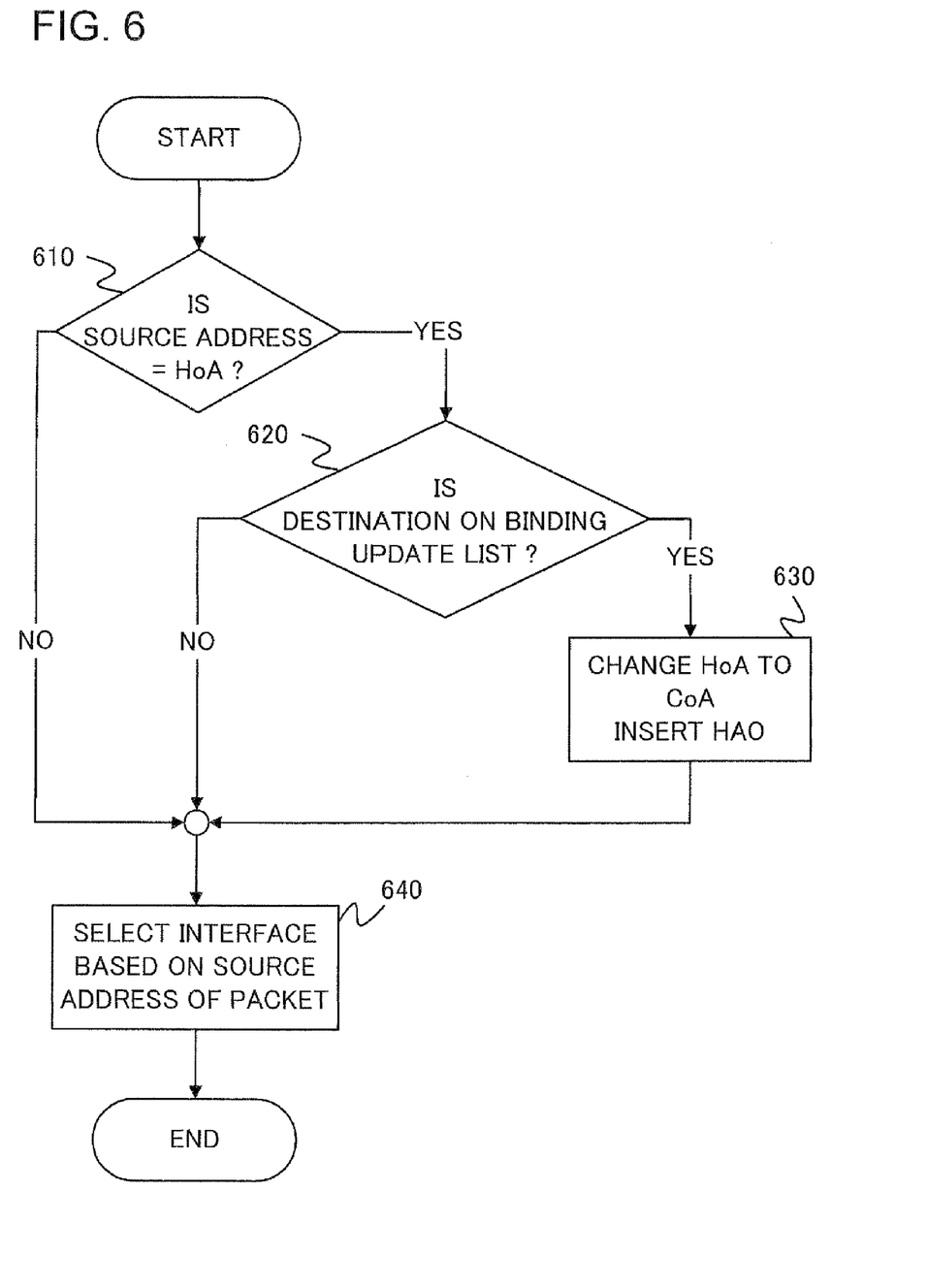
FIG. 6 is a flowchart explaining an example of an algorithm in which the interface controller can use to select the appropriate network interface for packet transmission according to the embodiment of the present invention.

FIG. 6 is a flowchart explaining an example of an algorithm in which the interface controller can use to select the appropriate network interface for packet transmission according to the embodiment of the present invention. As shown in FIG. 6, in step 610, the source address of the packet is first checked if it is equal to the HoA. This HoA is either specified by the service provider, if the service provider provides Mobil IPv6 services, or it can be one that MN 100 selects (usually be choosing the address of the network interface 510-x which offers the longest range of connectivity).

If the source address does not equal the HoA, step 640 will be taken where the network interface 510-x will be selected based on which interface the source address is configured from. On the other hand, if the source address equals the HoA, step 620 will be taken. In this step 620, the destination address is checked if on its binding update list. If not, step 640 will be taken where the network interface 510-x will be selected based on which interface the source address is configured from. However, if the destination address is on its binding update list, step 630 will be taken where the source address (i.e. HoA) of the packet is changed to the CoA specified in the binding update list, and a home address destination option (HAO) is inserted into the packet header. Step 640 is next taken, where the network interface 510-x will be selected based on which interface the source address (i.e. CoA) is configured from.

Although the present invention allows the mobile node to enjoy prolonged session continuity through the use of HoA from a long-ranged interface and high transmission rate through the use of CoA from a high bandwidth interface, there are overheads involved. This overhead appears as the form of signalling messages for binding update messages and possibly messages required for return routability procedure. Such overhead is an acceptable cost if prolonged session continuity is required. If session continuity is not necessary, then such overheads are incurred for no extra benefits.

For instance, consider a typical web browsing application. The browser simply needs to send a web request to the web server, and the web server responds with the requested web page. The round-trip time is generally very short for typical web pages, and the retrieval protocol generally allows partial contents retrieval so that an application can suspend a large image download halfway, and later resume the download with a new source address. In this type of applications, session continuity is not necessary, and the overhead of signalling introduced by the present invention is more significant (since the actual data transmission period is short). Only applications such as real-time multimedia stream, VoIP (voice-over-IP), or video-conferencing applications would require prolonged session continuity.

For this reason, the present invention provides a mechanism for applications to turn on or off the operation of the present invention. One preferred mode of operation is to utilize the signal path 557 shown in FIG. 5. This is used by the applications layer 550 to query the interface controller 520 for determining the source address to use when establishing a new session. In this query, the interface controller 520 should be notified how long the session is expected to last. Base on this information, the interface controller 520 can then determine whether or not the mechanisms specified in the present invention should be activated. Preferably, the interface controller 520 can deduce the expected duration within which a high-bandwidth network interface will remain within the coverage area of the same access router. This can be computed if the interface controller 520 can estimate the velocity of MN 100, and the operating parameters (such as transmission power, operating frequency) of the particular network interface.

Also note the signal path 557 is merely a conceptual representation. It should be obvious to any person skilled in the relevant art that it can easily be implemented using other mechanisms. For instance, in UNIX environment, the kernel implementation uses a data structure known as socket buffer to pass messages between different layers in a network protocol stack. An implementation of the signal path 557 can therefore be a field in the socket buffer that can be set by the applications, and read by the interface controller 520.

Figure 7:
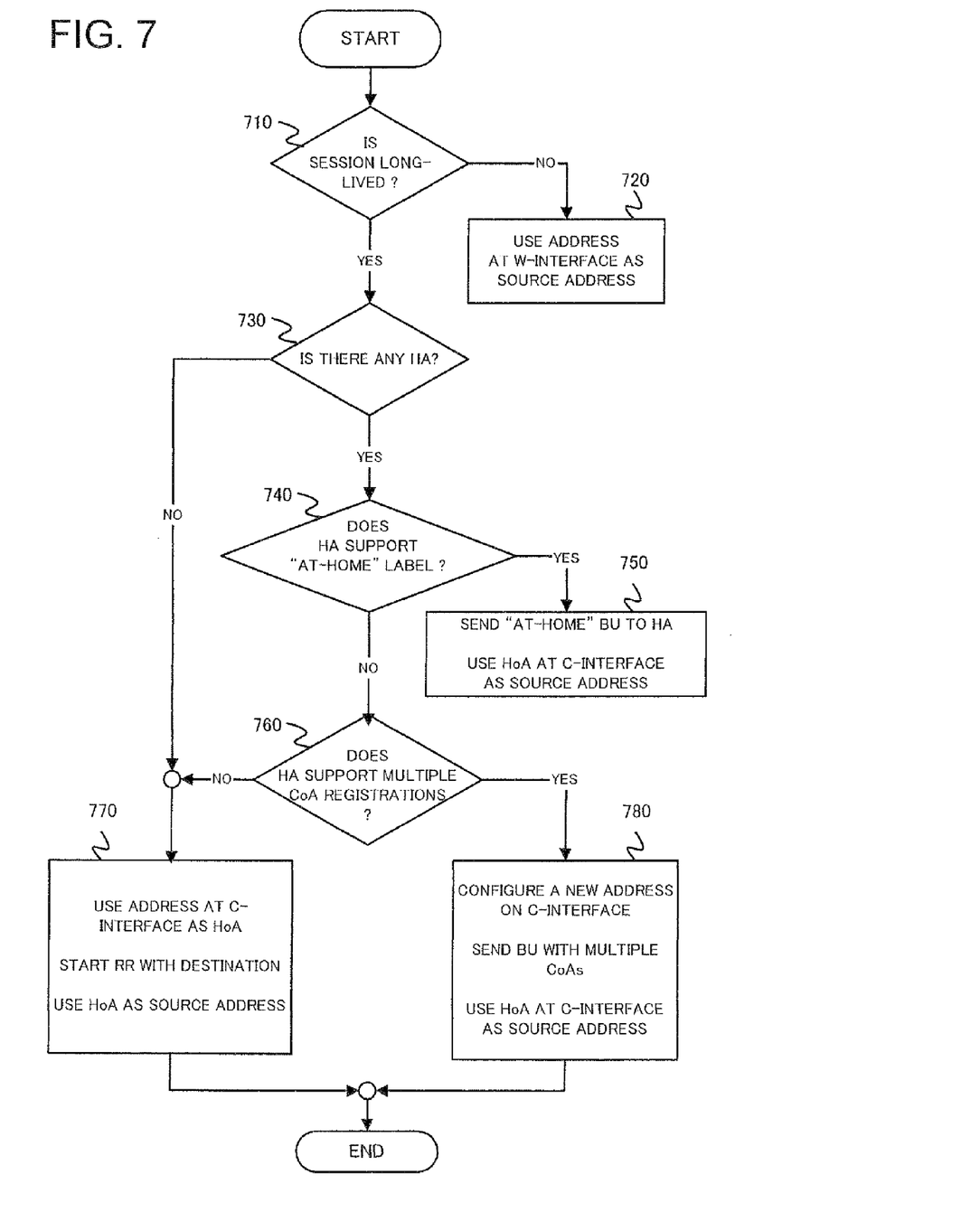
FIG. 7 is a flowchart explaining an example of an algorithm used by the interface controller to select a source address for use by applications layer given the expected duration of the new session.

FIG. 7 is a flowchart explaining an example of an algorithm used by the interface controller to select a source address for use by applications layer given the expected duration of the new session. As shown in FIG. 7, in step 710, the expected duration is first checked to see if it is long-lived. By long-lived, it means that the expected duration of the session is longer than the expected duration within which the high-bandwidth interface (e.g. W-Interface) will remain within the same coverage area.

If the session is not long-lived, step 720 is taken where the address of the high-bandwidth interface is used as the source address of the session. On the other hand, if the session is long-lived, step 730 is taken where the mobile node checks if the service provider provides any Mobile IP services. In particular, existence of the services of a home agent is checked. If no Mobile IP service (mobility service) is provided, step 770 is taken, else step 740 is taken.

In step 770, the address of the long-ranged interface (e.g. C-Interface) is selected as a HoA. Return routability (RR) procedure is then initiated with the destination, such as that described in FIG. 4. The selected HoA will be used as the source address (the address of the mobile node) of the session.

In step 740, the home agent is checked to see if it supports the "at-home" label. If the home agent supports the "at-home" label, then step 750 is taken where a BU message containing two care-of address options is sent to the home agent. One care-of address option specifies the "at-home" label, and the other care-of address option specifies the address of a high-bandwidth interface as the CoA. The HoA associated with the home agent is used as the source address (the address of the mobile node) of the session.

If the home agent does not support the "at-home" label, it is then checked if the home agent supports multiple CoA registrations, as shown in step 760. If the home agent does not support multiple CoA registrations, step 770 will be taken. If its does support multiple CoA registrations, step 780 will be taken. When the mobile node does not support the use of the "at-home" label, the mobile node does not need to implement the means for performing the operation about the "at-home" label.

In step 780, the mobile node first auto-configures a new address at the long-ranged interface (e.g. W-interface). This new address is then used as an alternate CoA of the HoA of the long-ranged interface, in addition to the address of the high-bandwidth interface. This is done by sending the home agent a binding update message containing two care-of address options. The first care-of address option specifies the newly configured address of the long-ranged interface, and the second care-of address option specifies the address of the high-bandwidth interface.

Although the invention has been herein shown and described in what is conceived to be the most practical and preferred embodiment, it will be appreciated by those skilled in the art that various modifications may be made in details of design and parameters without departing from the scope and ambit of the invention. For instance, the present invention is explained using the example of a mobile terminal with only two network interfaces. It will be obvious to a person skilled in the relevant art that the present invention can easily be applied to a mobile terminal with three or more network interfaces. Furthermore, it will also be obvious that the present invention can also be applied if the mobile terminal is actually a mobile router with multiple network interfaces.

Each functional block used in the above-mentioned embodiments of the present invention is typically realized as an LSI (Large Scale Integrated Circuit) which is an Integrated Circuit. Functional blocks can be processed into 1-chip respectively, and part or all of functional blocks can be processed into 1-chip so as to be included in 1-chip. The above LSI can be called IC (Integrated Circuit), System LSI or Super LSI, according to the degree of integration.

Furthermore, the way to be processed into Integrated Circuit is not only to manufacture LSI but also to produce a dedicated circuit or a general processor. After manufacturing LSI, FPGA (Field Programmable Gate Array) to be programmable, or Reconfigurable Processor to be reconfigure connection or configuration of circuit cells in LSI can be utilized.

Furthermore, if another new technology of integration substituting for LSI appears due to development of the semiconductor technology or creation of another technology, functional blocks can be of course integrated by using the new technology. For example, the biological technology may be the new technology.

INDUSTRIAL APPLICABILITY

The present invention has the advantage that a mobile device with multiple interfaces can make use of its multiple interfaces capability with Mobile IP, regardless whether if one of its interfaces is currently connected at home or not. Furthermore, the present invention also has the advantage that a mobile device with multiple interfaces can make use of its multiple interfaces capability with Mobile IP, regardless of whether its service providers offer Mobile IPv6 services or not. Thus, the present invention can be applied to the technical field of telecommunication in a packet-switched data communication network, or particularly to the technical field for controlling communication of a mobile node with multiple access interfaces.

The invention claimed is:

1. A mobile node using a plurality of network interfaces, the plurality of network interfaces including a first network interface configured with a home address on a home network, and a second network interface configured with a care-of address on a foreign network, the mobile node comprising:
   a sending unit configured to send a message to a home agent via one of the plurality of network interfaces, the message including a home address option for setting the home address and an option having a care-of address field, to enable the home agent to transmit packets destined for the mobile node to one of the first network interface and the second network interface used by the mobile node; and
   a setting unit configured to set the home address into the care-of address field in the message.

2. The mobile node according to claim 1, wherein the message further comprises a mobility header, the mobility header including at least two options each having a care-of address field.

3. The mobile node according to claim 2, wherein the setting unit further sets the care-of address into a care-of address field in a different option from the option having the care-of address field into which the home address is set, out of the at least two options each having a care-of address field in the mobility header.

4. The mobile node according to claim 1, wherein the setting unit further sets the care-of address into a care-of address field in a different option from the option having the care-of address field into which the home address is set.

5. The mobile node according to claim 1, wherein the message is a binding update message.

6. A communication control method performed by a mobile node using a plurality of network interfaces, the plurality of network interfaces including a first network interface configured with a home address on a home network, and a second network interface configured with a care-of address on a foreign network, the communication control method comprising the steps of:
   sending a message to a home agent via one of the plurality of network interfaces, the message including a home address option for setting the home address and an option having a care-of address field, to enable the home agent to transmit packets destined for the mobile node to one of the first network interface and the second network interface used by the mobile node; and
   setting the home address into the care-of address field in the message.

7. The communication control method according to claim 6, wherein the message further comprises a mobility header, the mobility header including at least two options each having a care-of address field.

8. The communication control method according to claim 7, wherein the setting step further comprises setting the care-of address into a care-of address field in a different option from the option having the care-of address field into which the home address is set, out of the at least two options each having a care-of address field in the mobility header.

9. The communication control method according to claim 6, wherein the setting step further comprises setting the care-of address into a care-of address field in a different option from the option having the care-of address field into which the home address is set.

10. The communication control method according to claim 6, wherein the message is a binding update message.

* * * * *